Figure 1:
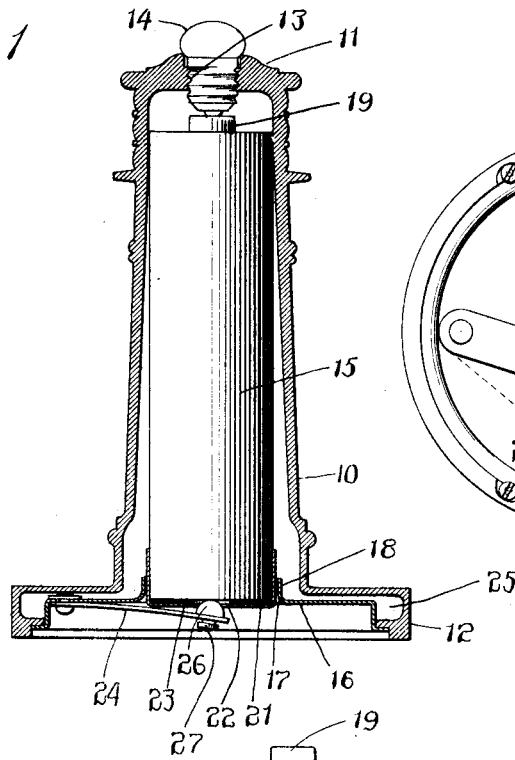

C. H. POLLAND.
CASE FOR PORTABLE ELECTRIC LAMPS.
APPLICATION FILED OCT. 1, 1914.

1,129,602.

Patented Feb. 23, 1915.

WITNESSES:
H. W. Meade
E. M. Culver

INVENTOR
Charles H. Polland
BY
A. M. Wooster
ATTORNEY

UNITED STATES PATENT OFFICE.

CHARLES H. POLLARD, OF BRIDGEPORT, CONNECTICUT, ASSIGNOR TO THE JENNINGS BROTHERS MANUFACTURING COMPANY, OF BRIDGEPORT, CONNECTICUT, A CORPORATION OF CONNECTICUT.

CASE FOR PORTABLE ELECTRIC LAMPS.

1,129,602.   Specification of Letters Patent.   Patented Feb. 23, 1915.

Application filed October 1, 1914. Serial No. 864,597.

*To all whom it may concern:*

Be it known that I, CHARLES H. POLLARD, a citizen of the United States, residing at Bridgeport, county of Fairfield, State of Connecticut, have invented an Improvement in Cases for Portable Electric Lamps, of which the following is a specification.

This invention has for its object to provide an inexpensive and ornamental case for portable electric lamps which shall be adapted to receive ordinary batteries as placed upon the market and shall be provided with a switch lever which also serves as a means for retaining the battery in the case. With this and other objects in view I have devised the novel portable electric lamp case which I will now describe, referring to the accompanying drawing forming a part of this specification and using reference characters to indicate the several parts.

Figure 2:
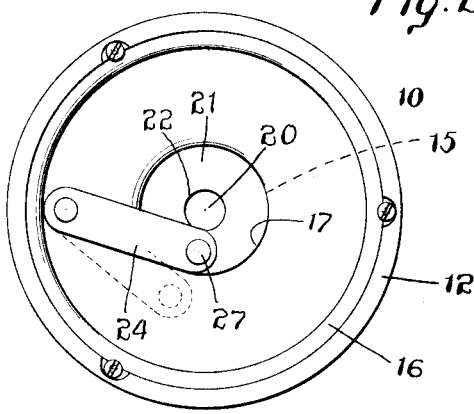
Figure 4:
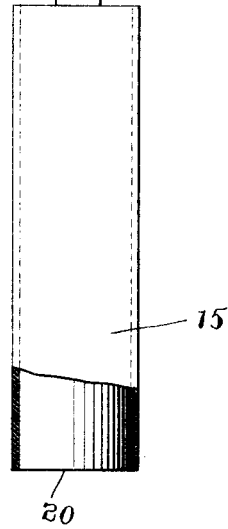
Figure 3:
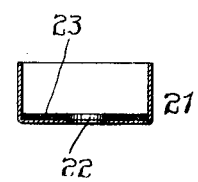

Figure 1 is a view partly in elevation and partly in section illustrating my novel electric lamp case with battery and lamp in place therein and the switch lever in the circuit closing position; Fig. 2 an inverted plan view corresponding therewith, with the exception that the switch lever is in the circuit opening position; Fig. 3 a sectional view of the insulating cap for the battery detached, and Fig. 4 is a view partly broken away, of a type of battery in common use.

10 denotes the case which may be of any ordinary or preferred configuration and is provided with a head 11 and a base 12 having a recess 25 in its under side. I have illustrated a case and the base therefor cast in a single piece, although said parts may be made of sheet metal if preferred. The head is provided with a threaded socket 13 to receive a lamp 14, the shell of which extends through the socket and into the case.

15 denotes the battery which may be of any ordinary type. I have shown the base as enlarged and the case as tapering from the base toward the head for ornamental purposes and for the further reason that it simplifies the casting operation and reduces the expense to the minimum. When the case is made tapering, as shown in Fig. 1, I make the internal diameter at the upper end just large enough to center the upper end of the battery and at the lower end I provide a centering plate 16 which is secured by screws or in any suitable manner in recess 25 in the base. I have shown the centering plate as provided with a hole 17 through which the battery may be passed with a centering flange 18 for the lower end of the battery.

19 denotes the positive pole and 20 the negative pole of the battery and 21 denotes an insulating cap which I place over the negative pole and which is provided with a central hole 22. This cap may be made of insulating material or it may be made of metal and insulated by means of an insulating washer 23 lying in the base of the cap and provided with a central hole corresponding with the hole in the cap. The battery is retained in the case by means of a switch lever 24 which is suitably pivoted in the recess in the base, either to the base itself or to the centering plate if used. This switch lever is made of resilient metal and is provided with a head 26 which is adapted to pass through the hole in the insulating cap, and the insulating washer if used, and to engage the negative pole of the battery. A finger piece 27 is also provided for convenience in manipulating the switch lever.

In assembling, the battery is passed into the case as in Fig. 1, the positive pole of the battery engaging the center contact of the lamp in the usual manner. The switch lever is then swung into engagement with the insulating cap, as in Fig. 2, to retain the battery in place. The passage of the current is from the positive pole of the battery to the center contact of the lamp, through the lamp to its shell and through the case, the centering plate if used, and the switch lever, to the negative pole of the battery. When the switch lever is in the position shown in Fig. 2, the circuit is open. To close the circuit and light the lamp, the operator simply swings the switch lever from the position shown in Fig. 2 to that shown in Fig. 1, that is, he swings the free end of the switch lever to the center, which places the head of the switch lever in engagement with the negative pole of the battery and closes the circuit.

Having thus described my invention I claim:

1. A case adapted to receive a battery and having a head adapted to receive an electric lamp with its contact in engagement with a pole of the battery, an insulating cap covering the other pole of the battery and having a hole, and a switch lever in the circuit and provided with a head which is adapted to engage the insulating cap to retain the battery in place with the circuit open and to close the circuit when the head is placed in engagement with a pole of the battery through the hole in the cap.

2. In combination, a case of the character described, a battery, an insulating cap therefor having a hole, and a switch lever in the circuit having a head adapted to engage the insulating cap to retain the battery in place with the circuit open and to close the circuit when the head is placed in engagement with a pole of the battery through the hole in the cap.

3. In combination, a case of the character described having a base, a battery, an insulating cap therefor having a hole, a centering plate in the base for the lower end of the battery and a switch lever in the circuit which is adapted to retain the battery in place with the circuit open and to close the circuit by engagement with a pole of the battery through the hole in the cap.

4. In combination, a case of the character described having a base with a recess in its under side, a battery, an insulating cap therefor having a hole, a plate secured in the recess and having a hole through which the battery may be passed and a centering flange for the battery, and a switch lever pivoted to said plate and acting to retain the battery in place with the circuit open and to close the circuit by engagement with a pole of the battery through the hole in the cap.

5. In combination, a case of the character described, a battery, a metallic cap therefor having an insulating washer in its base, said cap and washer having a hole therethrough and a switch lever in the circuit adapted to retain the battery in place with the circuit open and to close the circuit by engagement with a pole of the battery through the holes in the cap and washer.

6. The combination with a case of the character described, of a battery, an insulating cap therefor having a hole and a switch lever in the circuit acting to retain the battery in place with the circuit open and to close the circuit by engagement with a pole of the battery through the hole in the cap.

In testimony whereof I affix my signature in presence of two witnesses.

CHARLES H. POLLAND.

Witnesses:
E. A. JENNINGS,
B. N. ORIATT.